(12) United States Patent
Herzog et al.

(10) Patent No.: US 10,554,638 B2
(45) Date of Patent: Feb. 4, 2020

(54) TECHNIQUES TO VERIFY LOCATION FOR LOCATION BASED SERVICES

(71) Applicant: Microsoft Technology Licensing, LLC, Redmond, WA (US)

(72) Inventors: Shai Herzog, Bellevue, WA (US); Gur Kimchi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 15/453,052

(22) Filed: Mar. 8, 2017

(65) Prior Publication Data

US 2017/0180337 A1 Jun. 22, 2017

Related U.S. Application Data

(63) Continuation of application No. 12/817,988, filed on Jun. 17, 2010, now Pat. No. 9,626,696.

(51) Int. Cl.
*H04L 29/06* (2006.01)
*G06Q 30/02* (2012.01)
*H04W 12/06* (2009.01)

(52) U.S. Cl.
CPC ......... *H04L 63/06* (2013.01); *G06Q 30/0225* (2013.01); *G06Q 30/0259* (2013.01); *G06Q 30/0261* (2013.01); *H04L 63/0428* (2013.01); *H04L 63/083* (2013.01); *H04W 12/06* (2013.01); *G06F 2221/2111* (2013.01)

(58) Field of Classification Search
CPC .............................................. G06Q 30/0259
See application file for complete search history.

(56) References Cited

U.S. PATENT DOCUMENTS

| | | | |
|---|---|---|---|
| 5,737,710 | A | 4/1998 | Anthonyson |
| 5,809,161 | A | 9/1998 | Auty et al. |
| 6,363,255 | B1 | 3/2002 | Kuwahara |
| 6,366,696 | B1 | 4/2002 | Hertz et al. |

(Continued)

FOREIGN PATENT DOCUMENTS

| | | |
|---|---|---|
| KR | 10-2010-0026785 | 3/2010 |
| WO | WO 2002056530 | 7/2002 |

(Continued)

OTHER PUBLICATIONS

Ono et al. "Bi-level image coding with Melcode—comparison of block type code and arithmetic type code" IEEE Global Telecom Conference and Exhibition (Nov. 1989) pp. 1-6.*

(Continued)

*Primary Examiner* — Mia M Thomas

(57) ABSTRACT

Techniques to verify a participant's visit to a specific location are described. An embodiment may provide a system that generates a pattern that is unique to the location, and that may further be unique to a date or time, a transaction, or other criteria. Participants may capture the pattern, for example, using a mobile device, and transmit the pattern to a verification system. The verification system may decode, translate, decrypt or otherwise obtain information from the pattern. The information obtained from the pattern may be used to verify that the pattern came from the location. The participant may then receive credit for the visit. Other embodiments are described and claimed.

20 Claims, 7 Drawing Sheets

(56) References Cited

U.S. PATENT DOCUMENTS

| | | | |
|---|---|---|---|
| 6,418,424 B1* | 7/2002 | Hoffberg | G06F 3/00 706/21 |
| 6,591,242 B1 | 7/2003 | Karp et al. | |
| 6,664,922 B1* | 12/2003 | Fan | G01S 5/0027 342/357.64 |
| 7,020,555 B1* | 3/2006 | Janky | G01S 19/04 342/357.31 |
| 7,046,169 B2 | 5/2006 | Bucholz et al. | |
| 7,446,657 B2 | 11/2008 | Shaffer et al. | |
| 7,579,965 B2 | 8/2009 | Bucholz | |
| 7,945,709 B2 | 5/2011 | Cain et al. | |
| 8,045,764 B2 | 10/2011 | Hamza | |
| 8,229,458 B2 | 7/2012 | Busch | |
| 8,396,815 B2 | 3/2013 | Drory et al. | |
| 8,768,009 B1* | 7/2014 | Smith | G06K 9/6218 340/937 |
| 9,218,413 B2 | 12/2015 | Skeen et al. | |
| 9,437,058 B2 | 9/2016 | Luke et al. | |
| 9,626,696 B2* | 4/2017 | Herzog | G06Q 30/0259 |
| 10,073,859 B2* | 9/2018 | Hull | G06F 21/78 |
| 2002/0004785 A1* | 1/2002 | Schull | G03B 13/02 705/51 |
| 2002/0112002 A1 | 8/2002 | Abato | |
| 2002/0138590 A1 | 9/2002 | Beams et al. | |
| 2002/0188678 A1 | 12/2002 | Edecker et al. | |
| 2003/0036954 A1 | 2/2003 | Rayment | |
| 2003/0172306 A1 | 9/2003 | Cain et al. | |
| 2004/0002039 A1 | 1/2004 | Draper et al. | |
| 2004/0002642 A1 | 1/2004 | Dekel et al. | |
| 2004/0183926 A1 | 9/2004 | Fukuda et al. | |
| 2004/0190853 A1 | 9/2004 | Dow et al. | |
| 2005/0003330 A1 | 1/2005 | Asgarinejad et al. | |
| 2005/0105798 A1 | 5/2005 | Nguyen et al. | |
| 2005/0131740 A1 | 6/2005 | Maasnzio et al. | |
| 2005/0152665 A1 | 7/2005 | Shibata et al. | |
| 2005/0216454 A1 | 9/2005 | Diab et al. | |
| 2006/0112086 A1 | 5/2006 | Douress et al. | |
| 2006/0156209 A1 | 7/2006 | Matsuura | |
| 2006/0251249 A1* | 11/2006 | Orr | G06F 7/588 380/46 |
| 2006/0252022 A1* | 11/2006 | Matthews, Jr. | G09B 5/00 434/350 |
| 2007/0047816 A1* | 3/2007 | Graham | G06F 16/93 382/181 |
| 2007/0122786 A1 | 5/2007 | Relan et al. | |
| 2007/0174742 A1 | 7/2007 | Hikita et al. | |
| 2007/0198427 A1* | 8/2007 | Vajjiravel | G06Q 30/06 705/59 |
| 2007/0242899 A1 | 10/2007 | Satoh et al. | |
| 2007/0274571 A1 | 11/2007 | Hamza | |
| 2007/0283115 A1 | 12/2007 | Freeman et al. | |
| 2007/0283123 A1 | 12/2007 | Vick et al. | |
| 2007/0288559 A1 | 12/2007 | Parsadayan | |
| 2008/0122869 A1 | 5/2008 | Aratani et al. | |
| 2008/0207220 A1* | 8/2008 | Aaron | H04W 12/1206 455/456.1 |
| 2008/0209332 A1 | 8/2008 | Chevsky et al. | |
| 2008/0231448 A1 | 9/2008 | Fowler et al. | |
| 2008/0248815 A1 | 10/2008 | Busch | |
| 2008/0264701 A1 | 10/2008 | Radtke et al. | |
| 2008/0302867 A1* | 12/2008 | Holberg | G06Q 30/02 235/375 |
| 2009/0076925 A1 | 3/2009 | DeWitt et al. | |
| 2009/0163183 A1 | 5/2009 | O'Donoghue et al. | |
| 2009/0158397 A1* | 6/2009 | Herzog | H04L 51/38 726/4 |
| 2009/0160939 A1* | 6/2009 | Fernandez | G08B 13/19608 348/158 |
| 2009/0163182 A1 | 6/2009 | Gatti et al. | |
| 2009/0204905 A1 | 8/2009 | Toghia | |
| 2009/0313109 A1* | 12/2009 | Bous | G06Q 30/02 705/14.31 |
| 2010/0017126 A1 | 1/2010 | Holcman et al. | |
| 2010/0082491 A1 | 4/2010 | Rosenblatt et al. | |
| 2010/0145729 A1* | 6/2010 | Katz | G06Q 10/06315 705/3 |
| 2010/0279649 A1* | 11/2010 | Thomas | G06Q 10/10 455/404.2 |
| 2011/0082801 A1* | 4/2011 | Baghdasaryan | G06Q 20/10 705/75 |
| 2011/0087538 A1* | 4/2011 | Bous | G06Q 30/02 705/14.34 |
| 2011/0093340 A1* | 4/2011 | Kramer | G06Q 30/02 705/14.58 |
| 2011/0131172 A1* | 6/2011 | Herzog | G06Q 10/10 706/58 |
| 2011/0214174 A1* | 9/2011 | Herzog | H04L 63/0807 726/10 |
| 2012/0050542 A1 | 3/2012 | Chabreck et al. | |
| 2012/0113141 A1* | 5/2012 | Zimmerman | G06Q 30/0643 345/633 |
| 2012/0209904 A1 | 8/2012 | Huang | |
| 2012/0245995 A1 | 9/2012 | Chawla | |
| 2013/0018714 A1 | 1/2013 | George | |
| 2013/0018734 A1 | 1/2013 | Perret | |
| 2013/0212065 A1* | 8/2013 | Rahnama | G06F 17/30002 707/609 |
| 2014/0143061 A1 | 5/2014 | Abhyanker | |
| 2014/0195664 A1* | 7/2014 | Rahnama | H04W 4/70 709/223 |
| 2015/0095158 A1 | 4/2015 | Nasserbakht et al. | |
| 2015/0142560 A1 | 5/2015 | Singh | |
| 2015/0199722 A1 | 7/2015 | Gottesman et al. | |
| 2015/0339719 A1 | 11/2015 | Bourakov et al. | |

FOREIGN PATENT DOCUMENTS

| | | |
|---|---|---|
| WO | WO 2008115858 | 9/2008 |
| WO | WO 2009073832 | 6/2009 |

OTHER PUBLICATIONS

Bettini, Claudio et al., "Protecting Privacy Against Location-based Personal Identification", Nov. 15, 2005, 14 pages.

Chinese Notice of Allowance in Application 201180029836.9, dated Sep. 29, 2015, 4 pages.

Chinese Office Action in Application 201180029836.9, dated Oct. 10, 2014, 14 pages.

Chinese Office Action in Application 201180029836.9, dated Apr. 21, 2015, 6 pages.

Doctorow, Cory, "Chinese launch encrypted GPS", May 8, 2008, 3 pages. http://boingboing.net/2008/05/08/chinese-launch-encry.html.

European Communications in Application 11796165.6, dated Feb. 13, 2014, 2 pages.

European Search Report in Application 1176165.6, dated Mar. 24, 2016, 8 pages.

PCT International Search Report in PCT/US2011/038864, dated Feb. 9, 2012, 12 pages.

U.S. Appl. No. 12/817,988, Amendment and Response filed Jan. 4, 2016, 11 pgs.

U.S. Appl. No. 12/817,988, Amendment and Response filed Jan. 9, 2015, 13 pgs.

U.S. Appl. No. 12/817,988, Amendment and Response filed Dec. 2, 2013, 10 pgs.

U.S. Appl. No. 12/817,988, Amendment and Response filed Jul. 25, 2016, 12 pgs.

U.S. Appl. No. 12/817,988, Amendment and Response filed Jul. 28, 2014, 14 pgs.

U.S. Appl. No. 12/817,988, Notice of Allowance dated Dec. 9, 2016, 11 pgs.

U.S. Appl. No. 12/817,988, Office Action dated Oct. 9, 2014, 27 pgs.

U.S. Appl. No. 12/817,988, Office Action dated Feb. 23, 2016, 22 pgs.

U.S. Appl. No. 12/817,988, Office Action dated Mar. 27, 2014, 30 pgs.

U.S. Appl. No. 12/817,988, Office Action dated Jul. 1, 2015, 14 pgs.

(56) References Cited

OTHER PUBLICATIONS

U.S. Appl. No. 12/817,988, Office Action dated Aug. 1, 2013, 17 pgs.
Yavas, Gokhan et al., "A data mining approach for location prediction in mobile environments", Data & Knowledge Engineering, vol. 54, pp. 121-146, May 3, 2004.
"Office Action Issued in European Patent Application No. 11796165.6", dated Jan. 30, 2019, 11 Pages.

* cited by examiner

500

PROVIDE A NON-STATIC PATTERN GENERATOR TO A LOCATION OWNER
502

RECEIVE A VISIT PROOF FROM A PARTICIPANT
504

VERIFY THE VISIT PROOF
506

CONFIRM A VISIT STATUS FOR THE PARTICIPANT
508

*FIG. 5*

TECHNIQUES TO VERIFY LOCATION FOR LOCATION BASED SERVICES

CROSS-REFERENCE TO RELATED APPLICATIONS

This application is a continuation application of U.S. patent application Ser. No. 12/817,988, entitled "TECHNIQUES TO VERIFY LOCATION FOR LOCATION BASED SERVICES," filed on Jun. 17, 2010, the entire disclosure of which is hereby incorporated herein by reference.

BACKGROUND

Augmented reality mobile applications and other location based services may combine a virtual world experience with a physical or real world experience. For example, some applications allow participants to interact virtually with other participants visiting real locations, such as brick-and-mortar businesses, points of interest, etc. Participants may be rewarded for visiting the real locations. However, it may be difficult to prove such a visit. Conventional systems that attempt to prove that the visit took place may be relatively easy for participants to cheat. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to verify a user's location for location-based services. Some embodiments are particularly directed to techniques to verify user's location where the technique may be independent of the location-based service, and/or may be operated at least partially off-line. In one embodiment, for example, a technique may comprise providing a non-static pattern generator to a location owner. The technique may further include receiving a visit proof from a participant of a location based service. The visit proof may be a captured pattern from the pattern generator. The technique may further include verifying the visit proof, and confirming a visit status for the participant. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5 illustrates an embodiment of a logic flow.

DETAILED DESCRIPTION

Various embodiments are directed to systems and methods for verifying a participant's visit to a specific location. Participants in a business loyalty or augmented reality application may be rewarded to visits to specific locations, such as a business or a point of interest. Embodiments of the invention provide a system that generates a pattern that is unique to the location, and that may further be unique to a date or time, a transaction, or other criteria. Participants may capture the pattern, for example, using a mobile device, and transmit the pattern to a verification system. Capturing the pattern may include photographing a visual pattern, or recording a tone or sound, or conducting a wireless signal exchange. The pattern may be transmitted at the location, or at a later time by the participant. The verification system may decode, translate, decrypt or otherwise obtain information from the pattern. The information obtained from the pattern may be used to verify that the pattern came from the location. The participant may then receive credit for the visit.

Figure 1:
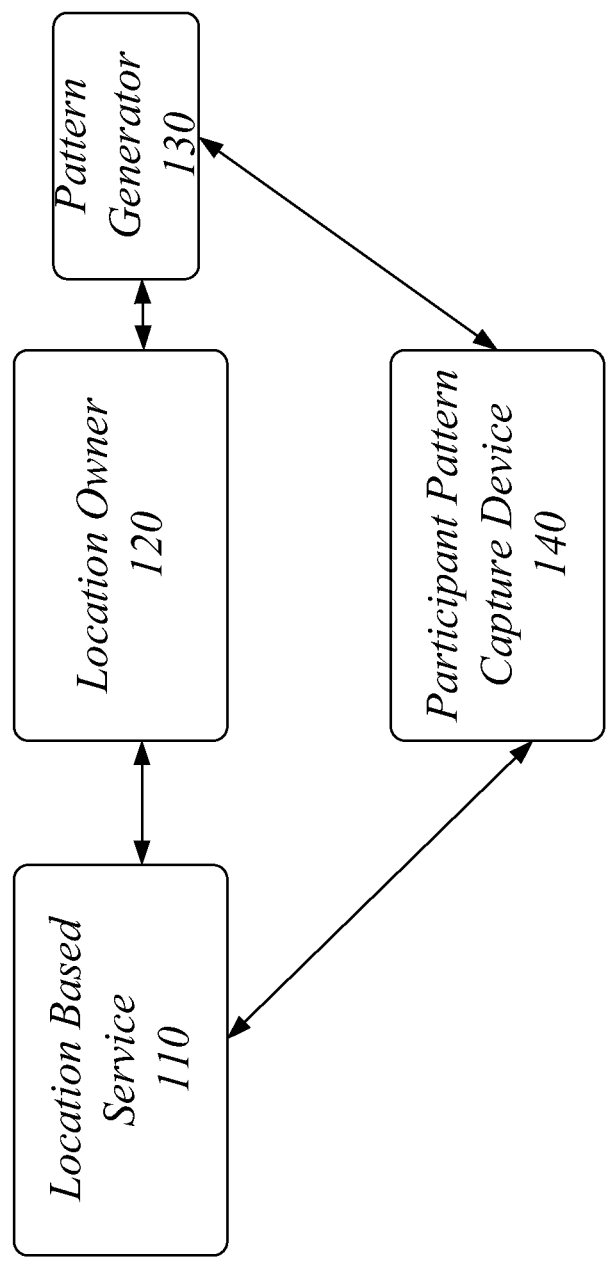
FIG. 1 illustrates an embodiment of a system for verifying a visit for a location based service.

FIG. 1 illustrates a block diagram for a system 100 to verify a participant's visit to a specific location. In one embodiment, for example, the system 100 may comprise a computer-implemented system 100 having multiple components. The components may include, for example, a location based service 110, a pattern generator 130 and a participant pattern capture device 140. System 100 may further include a location owner 120, which may refer to an entity that sets up and makes use of pattern generator 130, and that may receive benefit of location based service 110 and/or reward participants in location based service 110.

As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, components of the system 100 may be implemented as part of one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components may be communicatively coupled via various types of communications media. The components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may comprise a location based service 110. Location based service 110 may include an application or service that requires a location visit by a participant.

In various embodiments, the system 100 may comprise a location owner 120. Location owner 120 may be a business owner, or other entity, that wishes to participate in location based service 110. Location owner 120 may interact with location based service 110 to establish an account and receive pattern generator 130. Location owner 120 may provide information to location based service 110, such as an address for a location, conditions that must be met by a participant in order to receive visit credit, data that should be collected, etc. The address provided may be a postal address, a geolocation (i.e. latitude and longitude), a floor or level, and/or an entrance location, etc. Location owner 120 may also provide information such as operational data (open hours, happy hours), and dynamic data (events, sales, coupons, etc.). In an embodiment, location owner 120 determines whether the conditions for a visit are satisfied, and may restrict access to a visit proof until the conditions are met. In various embodiments, a location may be a physical location or a virtual one.

Location owner 120 may be assigned a unique location owner key that may be used to generate a proof of visit. Location based service 110 and location owner 120 may share the location owner key. The location owner key may include a randomly generated cryptographic key, and is discussed further below.

The system 100 may comprise a pattern generator 130. Pattern generator 130 may be software operable on a computing device already on site at the location specified by location owner 120. Pattern generator 130 may be a stand-alone device, or integrated as part of a system of devices. Pattern generator 130 may generate a unique non-static pattern at the location that may then be captured by a participant in location based service 110. The pattern may be different for each participant, over time, and/or for each transaction, e.g., dynamic or non-static. In an embodiment, a pattern may be restricted to a single use to prevent replaying or cloning, or may be restricted to a specific number of usages, after which the pattern will be rejected. Pattern generator 130 may use the location owner key to encrypt the pattern. The pattern may comprise any combination of multimedia information presented using different communication modalities. Examples for a pattern may include without limitation: a visual pattern, such as a bar code; an audio pattern, such as a sound or tone; a wireless signal exchange, such as a Bluetooth exchange or a radio frequency signal; an alphanumeric string; a combination of any of the above, and other unique patterns. The pattern may be displayed, for example, on a computer monitor, a screen, a printed receipt, through a speaker, or via a transmitter. In an embodiment where the pattern generator 130 is software operating on a location owner device, the display function may be provided by the device. In an embodiment where the pattern generator 130 is a stand-alone device, the stand-alone device may provide the display function.

The system 100 may include a participant pattern capture device 140. Participant pattern capture device 140 may be any device capable of capturing the pattern displayed by pattern generator 130. Examples may include a smart phone, a multi-function cellular telephone, a mobile computing device, a camera, a portable music player, an audio or video recording device, etc. In various embodiments, pattern generator 130 and/or participant pattern capture device 140 may be capable of wired communications, wireless communications, or a combination of wired and wireless communications.

Participant pattern capture device 140 may, if capable, transmit the captured pattern to location based service 110 right away, or at a later time. If the device 140 is not capable of wireless transmission, or when conditions are inadequate for a wireless transmission, the participant may connect the device 140 to a second device to transfer the pattern to the second device. The pattern may then be transmitted via the second device.

Figure 2:
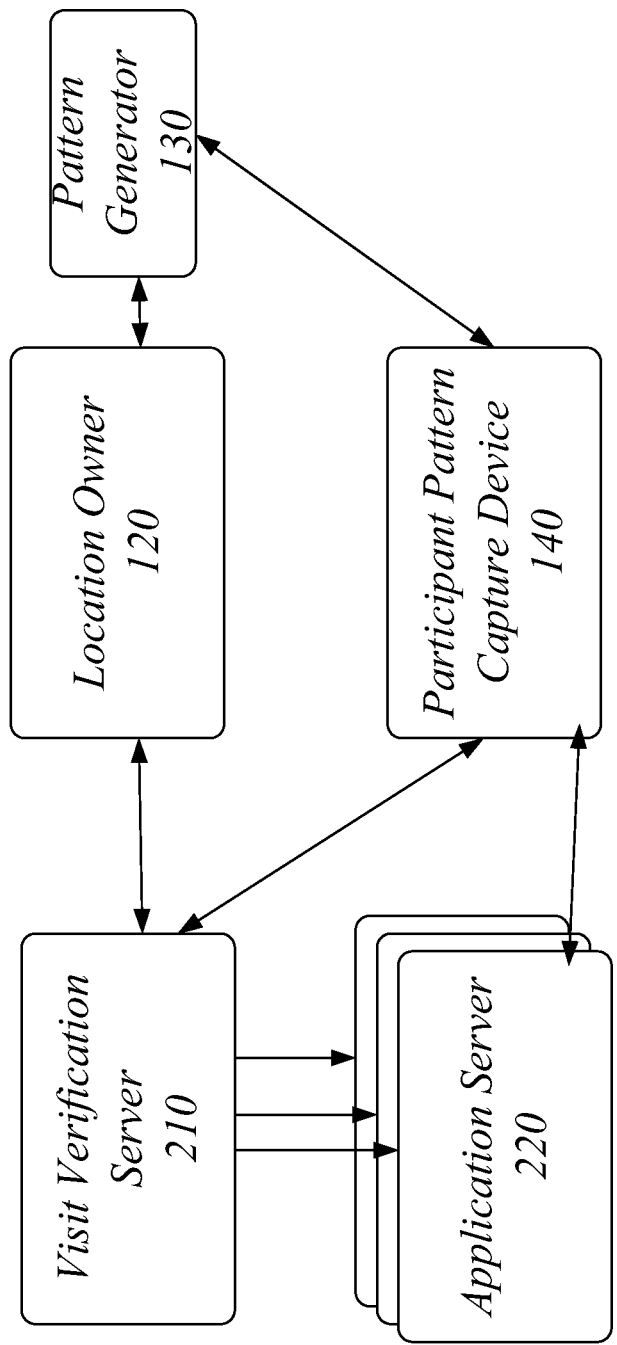
FIG. 2 illustrates an embodiment of a second system for verifying a visit for a location based service.

FIG. 2 illustrates a block diagram of a system 200 to verify a participant's visit to a specific location. The system 200 may be similar to the system 100, except that location based service 110 may be two separate entities. For example, location based service 110 may be comprised of a visit verification server 210 and an application server 220.

Visit verification server 210 may receive information for the location owner 120 to create an account for the location owner 120, and may provide the pattern generator 130 as previously described above.

Application server 220 may provide the functionality for a specific location based service. Examples may include, but are not limited to, Foursquare™, WeReward, Loopt, Gowalla, and MyTown. Application server 220 may be independent from visit verification server 210. That is, they may be physically separate, and/or owned by different entities. Visit verification server 210 may provide visit verification services for a plurality of application servers 220. Visit verification server 210 and application server(s) 220 may be in communication with each other, for example, via a network, however, such communication is not required.

In an embodiment, a receipt that the visit is verified may be sent from the visit verification server 210 to the participant and/or to one or more application server(s) 220. If the participant pattern capture device 140 is not capable of wireless communication, other means may be used to send the receipt to the participant, for example, via an email address, a text message to a cellular telephone, etc. In an embodiment, the participant may send the receipt to application server 220.

In an embodiment, the participant may send a visit proof to application server 220, which may forward the visit proof to visit verification server 210 for verification. Visit verification server 210 may verify the visit and send a receipt to application server 220, which may confirm the visit with the participant.

Figure 3:
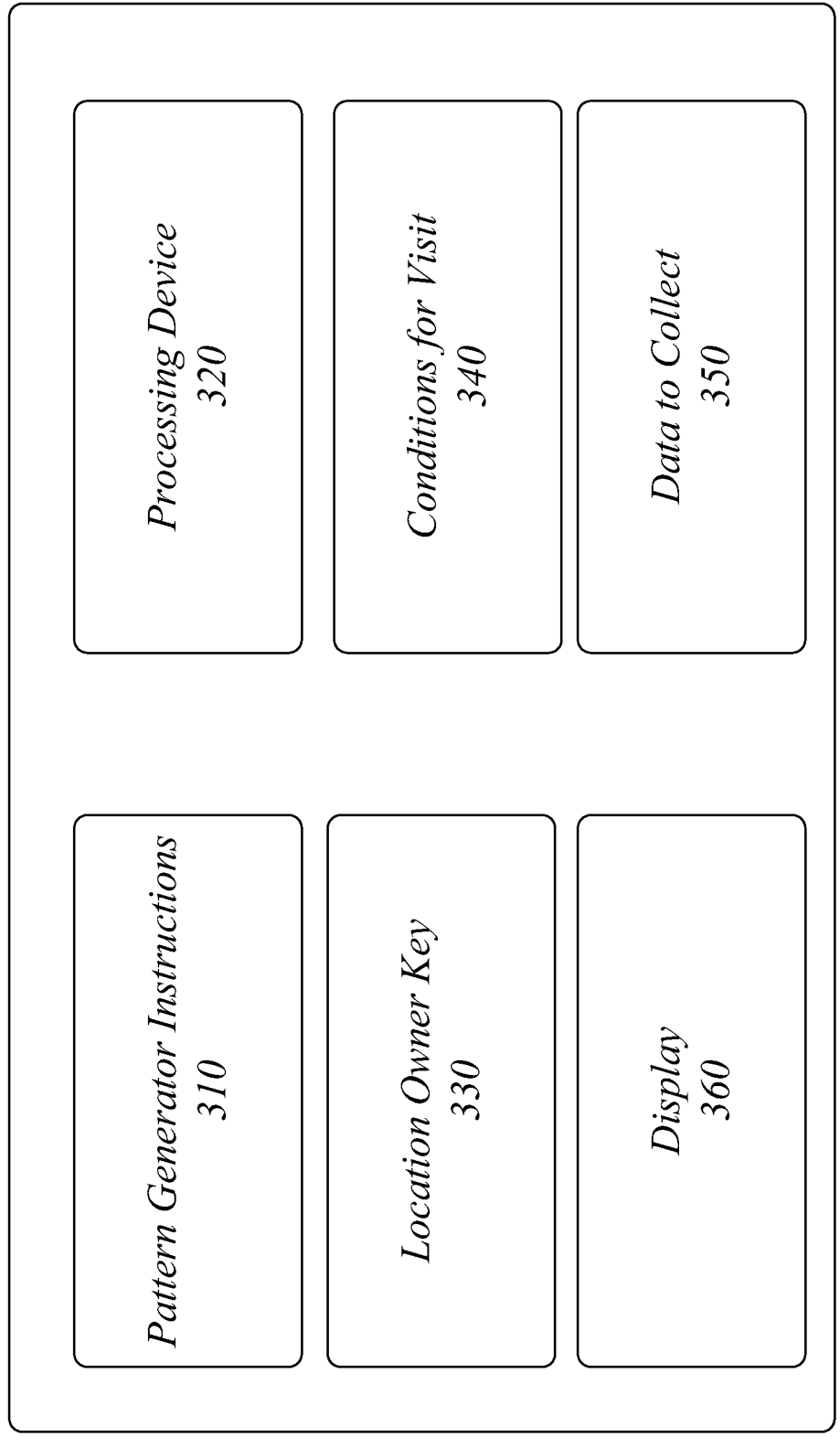
FIG. 3 illustrates an embodiment of a pattern generating system.

FIG. 3 illustrates a block diagram of a pattern generating system 300. Pattern generating system 300 may be an embodiment of pattern generator 130. Pattern generating system 300 may comprise pattern generator instructions 310 and a processing device 320. Pattern generator instructions 310 may cause pattern generating system 300 to create a unique location-specific pattern that may be captured by a participant.

In an embodiment, pattern generator instructions 310 may be provided to location owner 120 as executable software, which may installed on a processing device 320, such as a computer or a cash register, by the location owner. In an embodiment, the pattern generator instructions 310 and the processing device 320 may be components of a stand-alone device provided to location owner 120. In a stand-alone device, the pattern generator instructions 310 may be executed by the processing device 320, for example, a processor, within the device.

Pattern generating system 300 may further comprise various data that may be used by pattern generator instructions 310 to generate patterns. Pattern generating system 300 may generate a pattern that includes information about the visit, such as the address or map coordinates for the location that will provide a proof of visit. Additional information may also be included, such as the location owner name, account numbers, the action taken on the premises, and so forth. Pattern generating system 300 may use location owner key 330 to cryptographically encrypt or sign the pattern so that a third party intercepting the pattern could not fake a visit.

Pattern generating system 300 may use conditions for visit collection 340. Conditions for visit collection 340 may include conditions that location owner 120 sets that must be met by a participant in order to receive credit for the visit to the location. Conditions may include, for example, that a purchase is required, a purchase of more than a specified amount is required, a purchase of a particular type of item is required, a number of purchases required, etc. When a condition is met, pattern generator instructions 310 may generate a unique pattern to display. In an embodiment, location owner 120 may decide whether the conditions were met, and may then choose whether to use pattern generating system 300, or whether to allow access to a generated pattern. The pattern may contain information that the condition was met, or specific details about how the condition was met. When a condition is not met, then no pattern may be generated. In an embodiment, location owner 120 may determine whether the conditions are met. In such an embodiment, location owner 120 may prevent a pattern from generating when the conditions are not met, or may prevent access to the pattern.

Pattern generating system 300 may use data to collect 350 when generating a pattern. Location owner 120 may specify information that should be collected when a pattern is generated for a participant. Information that may be collected may include, for example, an amount of money spent, number of items purchased, a date/time stamp for the visit, etc. The information collected may be included as part of the pattern. Visit verification server 210 may then store the visit information collected. The stored visit information may be available to location owner 120 in raw form, or may be aggregated or operated on statistically.

Pattern generating system 300 may comprise a display 360. Display 360 is not limited to being a visual display. Instead, display 360 may be any device or mechanism that is able to present the pattern to the participant for capture. Display 360 may include, for example, a computer monitor, a screen, a printed receipt, a speaker, or a transmitter. In an embodiment where the pattern generator 130 is software operating on a location owner device, the display may be provided by the device. In an embodiment where the pattern generator 130 is a stand-alone device, the stand-alone device may provide the display.

Figure 4:
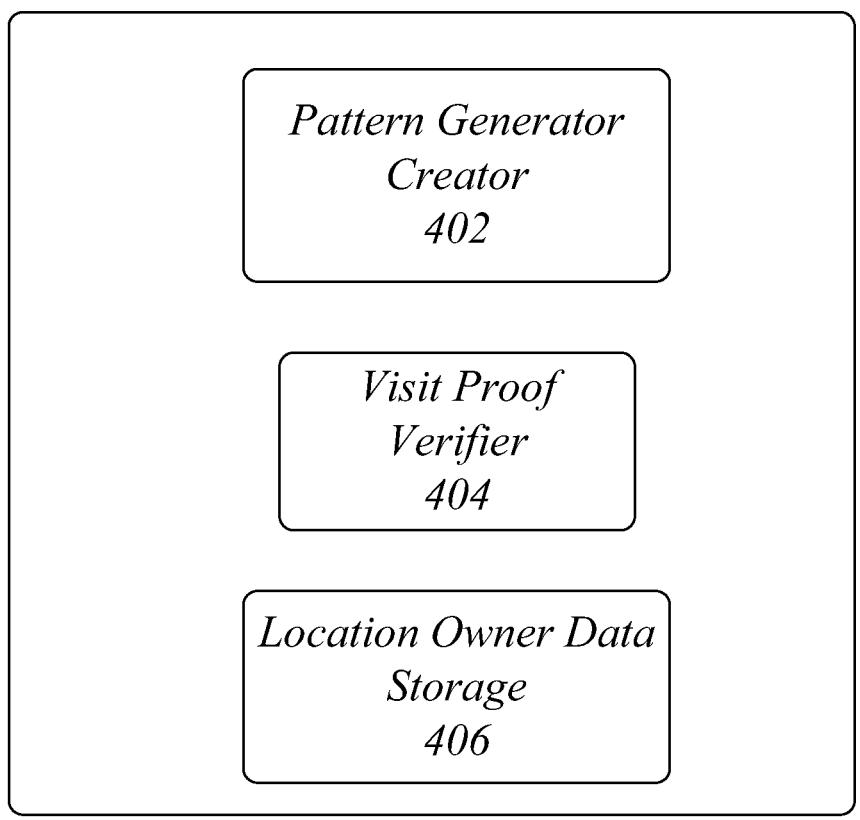
FIG. 4 illustrates an embodiment of a visit verification system.

FIG. 4 illustrates a block diagram of a visit verification system 400. The visit verification system 400 may implement all of the structure and/or operations for the visit verification server 210. Visit verification system 400 may include one or more components. For example, visit verification system 400 may include a pattern generator creator 402. Pattern generator creator 402 may generate the unique location owner key 330. Pattern generator creator 402 may produce software instructions, and data specific to a location owner 120, for use by pattern generator 130 in generating a pattern and encrypting the pattern with location owner key 330.

Visit verification system 400 may include a visit proof verifier 404. Visit proof verifier 404 may decode a visit proof, e.g., the pattern captured by and received from a participant. Decoding the visit proof may include decrypting the visit proof using the visit verification server 210 copy of location owner key 330. Decoding may also include extracting information from the visit proof, such as the location, transaction details, and/or data collected. Once the visit proof is decoded, visit proof verifier 404 may verify the authenticity of the visit proof. Verification may include using the decoded location to retrieve a location owner key 330, and using the key to decrypt and validate the pattern. Validating the pattern may include checking for a duplicate visit proof, as each visit proof may be unique or limited in the number of acceptable uses. A duplicate proof may indicate an attempt to cheat.

Visit verification system 400 may include location owner data storage 406. Location owner data storage 406 may store visit proofs, data collected with visit proofs, participant account information, or other data used by visit verification server 210. Some or all of data stored in storage 406 may be available for viewing or downloading by location owners and participants.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may provide a pattern generator to a location owner at block 502. For example, visit verification server 210 may receive information from a location owner 120 and may generate a location owner key unique to that location owner and specific location. The location owner key and a pattern generating device may be provided to the location owner.

The logic flow 500 may receive a visit proof from a participant of a location based service at block 504. For example, visit verification server 210 may receive a photograph of a bar code, a scanned image, a sound file of a recorded tone, a wireless signal exchange, an alphanumeric string or other unique pattern that includes information unique to a specific visit by a participant. In one embodiment, the visit proof may be encrypted to prevent an intercepting party from decoding the details of the visit. As an example, a visit proof may be decoded to contain the information: "Korner Koffee Shoppe, Aug. 6, 2010 6:42 am, beverage purchase, 08a9sdhfaohgds," which identifies, respectively, the location name, a date/time stamp, that a beverage was purchased, and a cryptographic signature.

The logic flow 500 may verify the visit proof at block 506. For example, visit verification server 210 may extract location information from the visit proof. Location information may include a unique location identifier assigned to the location owner. Visit verification server 210 may then identify and retrieve its copy of the location owner key using the location information. Visit verification server 210 may decrypt the visit proof with the location owner key. Visit verification server 210 may decode or convert the visit proof into data components that contain information about the location where the visit proof was obtained, and other data captured according to the location owner's specifications. The visit proof may be authenticated based on the location owner key. In an embodiment, a service such as MICROSOFT® LIVE provided by MICROSOFT CORPORATION, Redmond, Wash., and associated security credentials (e.g., LiveID), may facilitate identification and authentication of the participant and/or the location owner.

The logic flow 500 may confirm a visit status for the participant at block 508. For example, for a valid visit that meets the criteria of a visit for the location owner, the participant may receive a receipt. In an embodiment, the receipt may be sent to the application server that provides the location based service used by the participant. If the visit proof is somehow invalid, the participant does not receive credit for the visit. In an embodiment, a notification of visit failure may be sent.

Figure 6:
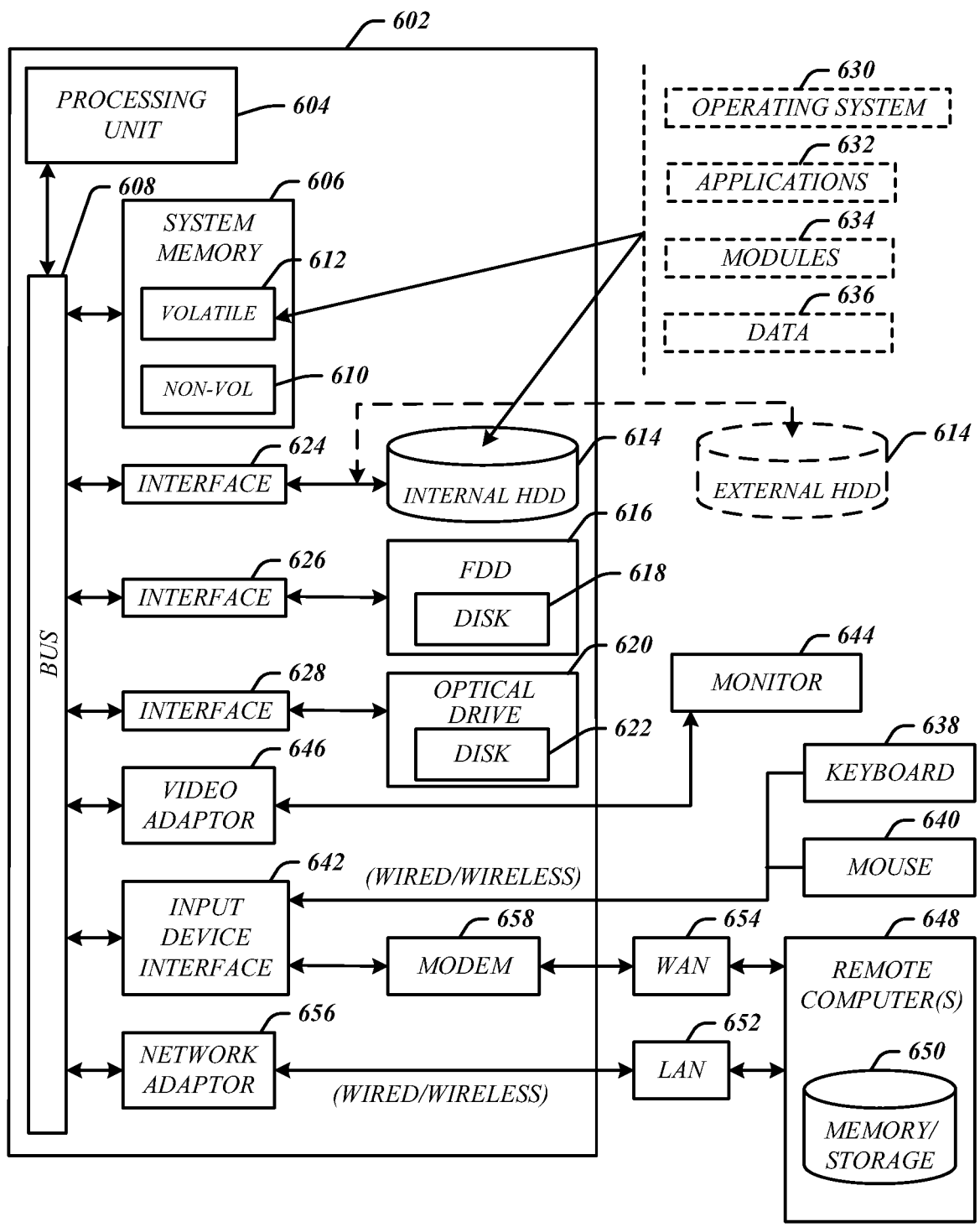
FIG. 6 illustrates an embodiment of a computing architecture.

FIG. 6 illustrates an embodiment of an exemplary computing architecture 600 suitable for implementing various embodiments as previously described. The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The system memory 606 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. The one or more application programs 632, other program modules 634, and program data 636 can include, for example, the pattern generator creator 402, and visit proof verifier 404.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
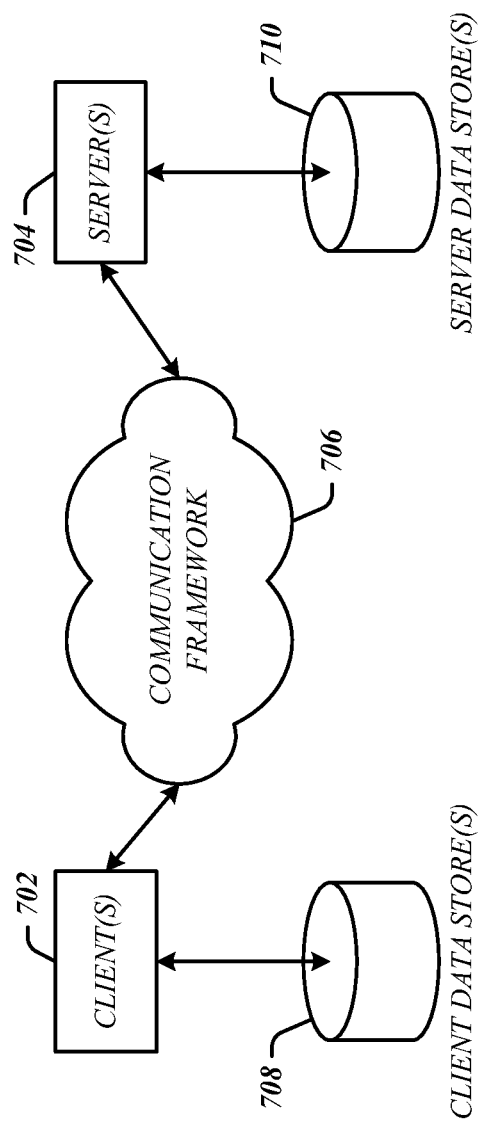
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 may implement the client systems 310, 400. The servers 704 may implement the server system 330. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 702 and the servers 704 may include various types of standard communication elements designed to be interoperable with the communications framework 706, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 702 and a server 704 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving a visit proof from a participant device associated with a first participant of a location based application, the visit proof captured during a visit to a physical location that is associated with a second participant of the location based application for confirming the visit to the physical location by the first participant;
   verifying the visit proof comprises a pattern that uniquely identifies the physical location and the visit, the pattern including an indication of whether one or more conditions were satisfied during the visit, the one or more conditions comprising a condition that at least one purchase be made by the first participant during the visit at the physical location; and
   upon verification of the visit proof, processing the pattern to determine whether the one or more conditions were satisfied during the visit.

2. The method of claim 1, wherein the pattern comprises a non-static pattern that is produced by a pattern generator and is specific to the physical location.

3. The method of claim 1, wherein:
   the one or more conditions further comprise a particular item to be purchased; and
   the method further comprises determining, from the visit proof, that the particular type of item was purchased at the physical location during the visit.

4. The method of claim 1, wherein:
   the one or more conditions further comprise an amount of money to be spent on the particular item; and
   the method further comprises determining, from the visit proof, the amount of money was spent on the purchase at the physical location during the visit.

5. The method of claim 1, wherein:
   the one or more conditions further comprise a specified amount of money to be spent during the visit; and
   the method further comprises determining, from the visit proof, an amount of money spent on the purchase at the physical location during the visit equaled or exceeded the specified amount of money.

6. The method of claim 1, wherein the visit proof comprises at least one of:
   a visual pattern;
   a recorded sound of an audio pattern;
   an alphanumeric string; or
   a wireless signal exchange.

7. The method of claim 1, wherein verifying that the visit proof comprises the pattern comprises:
   extracting location information from the visit proof;
   identifying a location owner key using the location information;
   decrypting the visit proof with the location owner key; and
   decoding the visit proof to retrieve visit data.

8. The method of claim 1, further comprising verifying that the visit proof is not an unauthorized duplicate of a previously received visit proof.

9. The method of claim 1, further comprising:
   based on a determination that the one or more conditions were satisfied, sending a visit receipt to the participant device indicating satisfaction of the one or more conditions; and
   based on a determination that the one or more conditions were not satisfied, sending a visit failure notification to the participant device indicating the one or more conditions were not satisfied.

10. The method of claim 1, further comprising storing the verified visit proof.

11. The method of claim 10, further comprising providing data from the stored verified visit proof to at least one of the first participant or the second participant.

12. An article comprising storage memory containing instructions that when executed enable a system to:
receive a visit proof comprising a non-static pattern that is unique to a physical location and unique for each visit to the physical location by a participant of a location based application, the visit proof confirming a visit to the physical location and the non-static pattern including an indication of whether one or more conditions were satisfied during the visit, the one or more conditions comprising a condition that a particular type of item be purchased at the physical location during the visit;
determine, from the visit proof, that the particular type of item was purchased at the physical location during the visit; and
transmit a visit receipt to at least one of a participant device or an application server that provides the location based application.

13. The article of claim 12, wherein the visit proof is encrypted and the article further comprises instructions that when executed enable the system to decrypt the visit proof.

14. The article of claim 13, wherein the visit proof is encrypted using a location owner key shared with the location based application.

15. The article of claim 12, wherein the visit proof comprises at least one of:
a visual pattern;
a recorded sound of an audio pattern;
an alphanumeric string; or
a wireless signal exchange.

16. A system, comprising:
an output device;
a processing unit; and
a memory for storing instructions, that when executed by the processing unit, perform a method, comprising:
generating a pattern unique for a physical location and unique for each visit to the physical location by a participant of a location based application, wherein the pattern comprises an indication of whether one or more conditions were satisfied during the visit, the one or more conditions comprising a condition that at least one purchase be made at the physical location during the visit;
when the one or more conditions were met, collecting information related to the visit, the collected information comprising a type of item purchased at the physical location during the visit; and
providing the pattern to the output device.

17. The system of claim 16, wherein the collected information further comprises an amount of money spent on the type of item purchased at the physical location during the visit.

18. The system of claim 16, wherein the output device comprises at least one of:
a visual display to display the pattern as a visual pattern;
a speaker to produce the pattern as an audio pattern; or
a transmitter to transmit a signal comprising a wireless electronic pattern of the pattern.

19. The system of claim 16, wherein the pattern is generated according to at least one of: a time, a date, a transaction, a visit condition, or a data collection requirement.

20. The system of claim 16, wherein the method further comprises encrypting the pattern using a location owner key shared with the location based application.

* * * * *